Patented Oct. 19, 1954

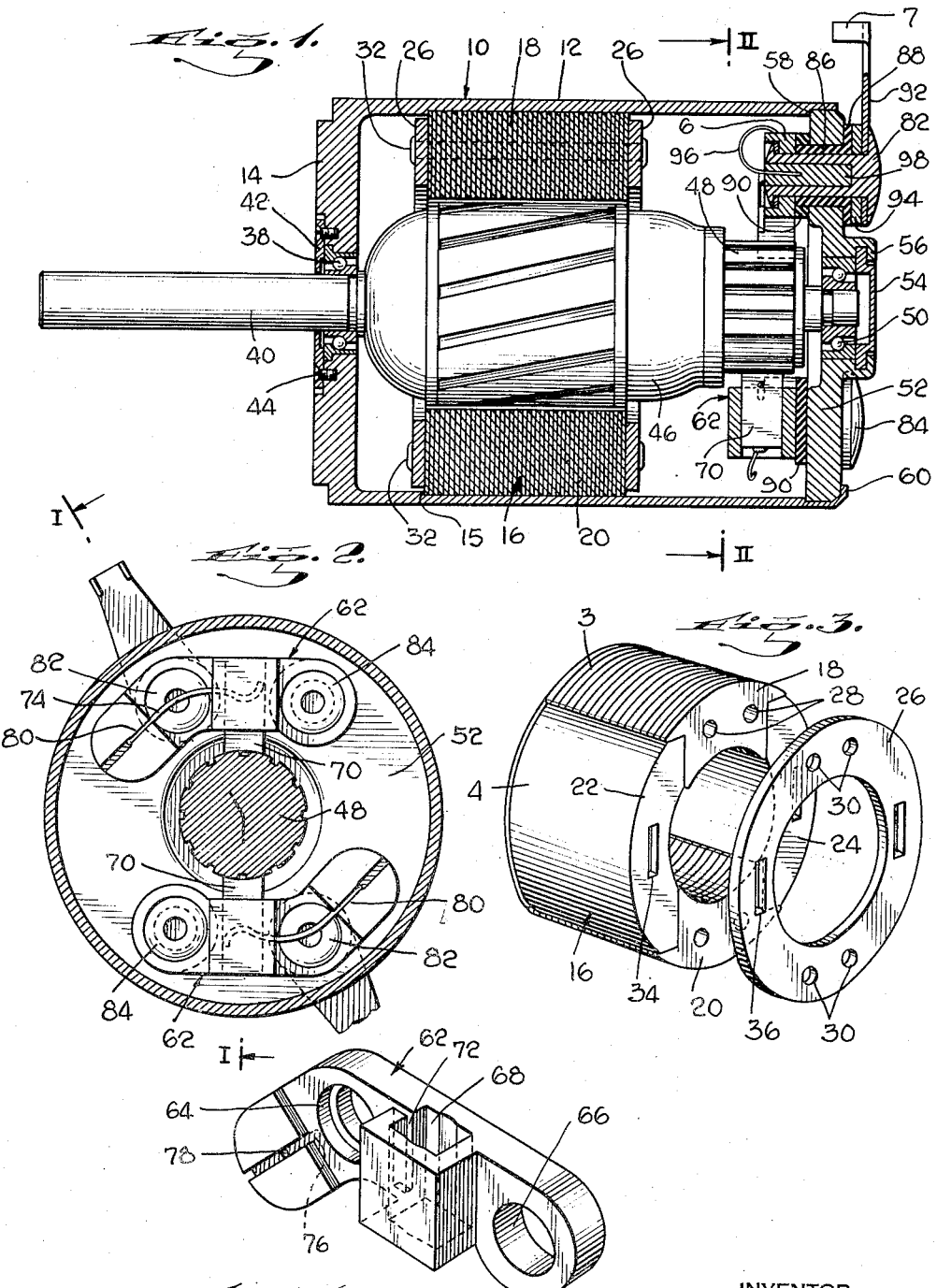

2,692,345

UNITED STATES PATENT OFFICE 2,692,345

PERMANENT MAGNET MOTOR

Eric C. Wahlberg, Stamford, Conn., assignor to Electrolux Corporation, Old Greenwich, Conn., a corporation of Delaware Application December 13, 1951, Serial No. 261,406

2 Claims. (Cl. 310—154)

My invention relates to electric motors, and more particularly to permanent magnet motors.

Motors of this type employ permanent magnets, rather than wound electromagnets, to produce the field magnetism. Heretofore it has been the practice to use permanent magnets as the pole pieces and to mount them within the casing of the motor by means of a hardened matrix. However, material, such as Alnico, which has the properties required of a permanent magnet, is extremely hard and brittle and thus very difficult to machine. Inasmuch as a very small air gap is required between the pole pieces and the armature, it has been necessary to grind the faces of the pole pieces as it is impossible to originally cast them to the exact dimensions required.

In accordance with my invention, on the other hand, the pole pieces are made of relatively soft electrical steel, while the permanent magnets are arranged between and in contact with the pole pieces. Thus, accurate dimensioning of the magnets is not required and consequently no grinding thereof is necessary. Furthermore, the magnets take the place of the matrix previously employed and thus the motor is able to withstand high temperatures without damage, whereas the matrix softens and melts under high temperature.

Another object of my invention is to provide a simplified arrangement of brush holders secured to one of the bearing brackets of the motor.

Further objects and advantages of my invention will be apparent from the following description considered in connection with the accompanying drawings, which form a part of this specification and in which:

Fig. 1 is a cross-sectional view of a permanent magnet motor in accordance with my invention and is taken on the line 1—1 of Fig. 2;

Fig. 2 is a cross-sectional view taken on the line 2—2 of Fig. 1;

Fig. 3 is an exploded view in perspective of the stator or field structure shown in Fig. 1; and Fig. 4 is a perspective view of a brush holder shown in Figs. 1 and 2.

Referring to the drawings, reference character 10 designates a motor casing which includes a cylindrical portion 12 and a preferably integral end wall 14, which end constitutes a bearing bracket. The inner surface of portion 12 is cylindrical, but is provided with a step or shoulder 15 adjacent to the end wall 14, whereby the interior diameter of the casing between the end wall and the shoulder is slightly less than the interior diameter of the remainder of the casing.

Disposed within the casing is a field or stator structure designated generally by reference character 16. This structure includes a plurality of pole pieces 18 and 20. As here shown there are two pole pieces, but any even number could be employed. An equal number of permanent magnets 22 and 24 is disposed between and in contact with the pole pieces 18 and 20. The pole pieces and magnets are retained together in the form of an annular ring by a pair of retaining rings 26 located at opposite ends thereof. The pole pieces have holes 28 drilled therethrough, while the retaining rings are formed with aligned holes 30. Tie members 32, such as rivets or bolts extend through the holes 28 and 30 so as to hold the pole pieces and retaining rings together. The permanent magnets and the retaining rings are formed with cooperating recesses and detents. As shown the permanent magnets are formed with recesses 34, while the rings are formed with aligned detents 36. These detents and recesses prevent any possibility of the magnets moving radially outwardly and assure that the magnets, pole pieces and retaining rings form a rigid stator structure.

It will be noted that the radius of the inner surface of the permanent magnets is slightly greater than the radius of the inner surfaces of the pole pieces, while the radius of the outer surface of the magnets is less than that of the outer surfaces of the pole pieces. As previously mentioned, the magnets must be made of material which is extremely hard and brittle and hence difficult to grind, while the pole pieces are made of relatively soft electrical steel. With the arrangement here shown it is not necessary to grind either the inner or the outer surfaces of the permanent magnets. The desired accurate air gap between the pole pieces and the armature is obtained by machining the inner surfaces of the pole pieces and the holes 28 for the tie members 32 are provided only in the pole pieces, through which they may be easily drilled. On the other hand, the recesses 34 in the magnets may be originally cast therein, thus avoiding the necessity of grinding the hard brittle material.

The outer surfaces of the pole pieces 18 and 20 are also machined accurately so as to fit within the portion of larger diameter of cylindrical casing 12. As here shown, the stator structure is seated against the shoulder 16 and is preferably held in place by shrinkage of the cylindrical casing 12. In order to accomplish this the casing is heated so as to expand it and thus increase slightly its diameter, whereupon the stator structure is inserted through the open end of the casing and the latter cooled, thus causing it to shrink and tightly grip the stator structure. Inasmuch as the change in dimension of the casing is very slight, the diameter of the outer surfaces of the pole pieces must be held to close tolerances and thus must be accurately machined. Due to the soft nature of the electrical steel this may be readily accomplished whereas it would be extremely difficult to grind the hard brittle metal required in the permanent magnets. However, due to the fact that the radius of the outer surfaces of the permanent magnets is slightly less than that of the pole pieces, no accuracy is required of these surfaces of the magnets.

End bracket 14 carries a combined radial and thrust bearing 38, the inner race of which is secured to an armature shaft 40, as by a press fit, while the outer race is held in place by means of a plate 42 secured to the end brackets by screws 44. As shown, this plate is flush with the outer surface of the end wall 14 so that this wall may serve as a mounting plate for mounting the motor on the device which it drives.

Armature shaft 40 carries the usual armature windings 46 and commutator 48. The other end of this shaft is mounted in a radial bearing 50, the inner race of which is secured to the shaft in a suitable manner, as by a press fit, while the outer race is mounted in an end bracket 52. This outer race is preferably axially displaceable in the end bracket in order to allow for expansion and contraction of the armature shaft. A bearing cap 54 is secured in place over the bearing 50 by means of a lip 56 of the end bracket being turned or spun over the edge of the cap. Bearing bracket 52 is secured in the cylindrical portion 12 of the motor casing. This end of the casing is formed with a shoulder 58 against which the bearing bracket seats and is secured in place by having lip portions 60 of the portion 12 of the casing turned or spun over the outer edge of the bearing bracket.

Referring more particularly to Figs. 2 and 4, reference character 62 designates generally a brush holder. This holder is provided with two apertures 64 and 66 for securing it to the bearing bracket 52 and between these apertures is formed a generally rectangular passageway 68 for receiving a brush 70. One side of the rectangular passageway 68 communicates with a slot 72 through which extends a brush spring 74 for urging the brush into contact with the commutator 48. The other end of the spring 74 extends for some distance through a slot 76 formed in an angularly disposed portion of the brush holder. A small hole 78 extends through the brush holder from the bottom of slot 76 and the end of the brush spring 74 is formed at right angles to the rest of the spring so as to extend into this hole 78. The brush spring is retained in the slot 76 by having the edges of the slot peened over as is indicated at 80. The spring 74 is preformed in such a manner that it exerts pressure against the outer end of the brush and holds the brush in contact with the commutator.

As is usual, two brush holders are provided and are located so that the brushes carried thereby bear against the commutator at opposite sides thereof. Each brush holder is secured to the bearing bracket 52 by means of rivets 82 and 84 which extend through openings 66 and 64, respectively, in the brush holder and through corresponding holes in the bearing brackets. As is shown in Fig. 1, an insulating bushing 86 having a flange 88 is provided between the rivet and the bearing bracket and an insulating washer 90 is provided between the inner surface of the bearing bracket and the brush holder. A terminal lug 92 is secured between the head of the rivet 82 and a metal washer 94. The shank of the rivet 82 is preferably hollow and a pigtail 96 leading from the brush 70 extends into the bore of the hollow rivet and is secured therein by solder 98.

Rivet 84 may be similar to rivet 82, but it is not necessary to provide it with the terminal lug 92 and washer 94, inasmuch as one terminal lug for each brush holder is obviously sufficient. It will be understood that there is a rivet 82 and 84 for each brush holder, although in Fig. 1 there is shown only the rivet 82 for the upper brush holder and the rivet 84 for the lower one, due to the manner in which the section is taken.

It will thus be seen that I have provided a permanent magnet motor wherein no grinding is required of the hard brittle permanent magnets. Also, I have provided a simplified brush holder structure which may be used not only in motors of the permanent magnet type, but also in motors having the ordinary wound fields. These brush holders are so assembled to the bearing bracket that there is no separate opening required through either the bracket or any other part of the motor casing for the electric leads, thus making possible a sealed casing. In this case it will be noted that the casing is entirely sealed, except for the bearing 38. This could be sealed by any suitable type of labyrinth seal.

While I have shown one more or less specific embodiment of my invention, it is to be understood that this has been done for purposes of illustration only and that the scope of my invention is not to be limited thereby, but is to be determined by the appended claims.

What I claim is:

1. In a permanent magnet motor, a plurality of pole pieces of relatively soft electrical steel, an equal number of permanent magnets disposed between and in contact with said pole pieces, a pair of retaining rings for holding said pole pieces and said magnets together in the form of an annular stator structure, said retaining rings and said pole pieces being formed with sets of aligned apertures, a tie member extending through each set of aligned apertures to secure said rings to said pole pieces, said rings and said magnets having cooperating recesses and detents for fixing said magnets in position between said rings and between said pole pieces, a wound armature, and means for mounting said armature for rotation within said annular stator structure.

2. In an electric motor, a casing, a stator structure mounted in said casing, a bearing bracket at each end of said casing, a wound armature rotatably mounted in said bearing brackets, a commutator on one end of said armature, the bearing bracket adjacent to said commutator being formed with apertures therethrough, a pair of brush holders, hollow metallic rivets extending through said apertures for securing said brush holders to the inner side of said last-mentioned end bracket, a brush carried by each brush holder, a pigtail secured at one end to each brush, the opposite end of each pigtail being secured in the bore of one of said rivets by solder, and terminal means connected to said rivets at the outer side of said last-mentioned bracket.

References Cited in the file of this patent

UNITED STATES PATENTS

| Number | Name | Date |
| --- | --- | --- |
| 2,028,176 | Whiteside | Jan. 21, 1936 |
| 2,048,161 | Klaiber | July 21, 1936 |
| 2,258,561 | Youhouse | Oct. 7, 1941 |
| 2,479,455 | Aronoff | Aug. 16, 1949 |
| 2,545,715 | Sullivan | Mar. 20, 1951 |

FOREIGN PATENTS

| Number | Country | Date |
| --- | --- | --- |
| 268,446 | Great Britain | Apr. 4, 1927 |
| 284,673 | Great Britain | Aug. 16, 1928 |